United States Patent Office 2,793,782
Patented May 28, 1957

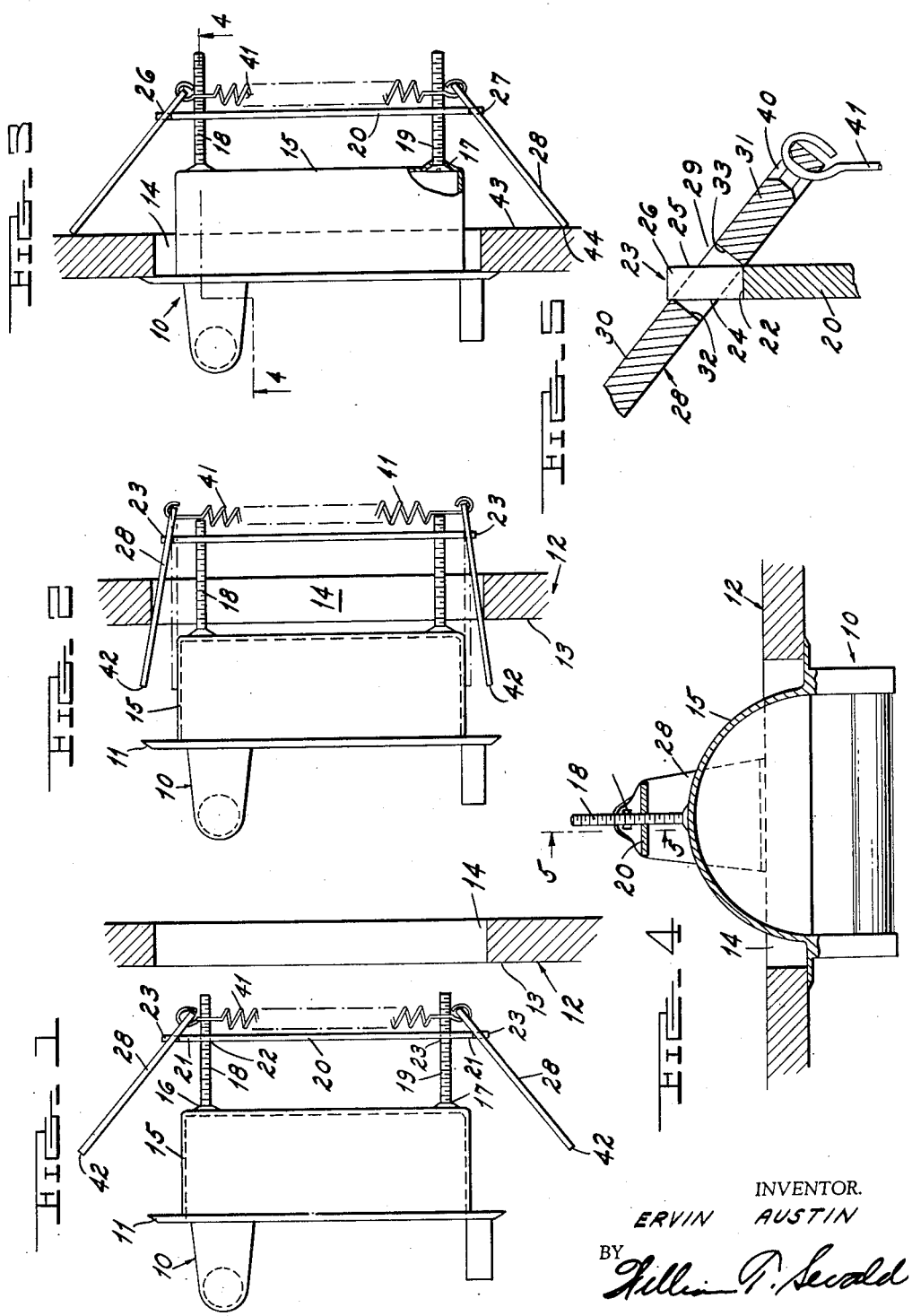

2,793,782

RECESSED WALL FIXTURE AND MOUNTING MEANS

Ervin Austin, Flint, Mich.

Application July 9, 1956, Serial No. 596,673

4 Claims. (Cl. 220—18)

This invention relates to a recessed wall fixture and mounting means.

Recessed wall fixtures and various mounting means have been employed heretofore to facilitate the easy application of the wall fixtures to the wall, however, the several devices of the prior art have not proven entirely satisfactory inasmuch as they are complicated in design and construction, expensive to manufacture, and difficult to use.

With the foregoing in view, the primary object of the invention is to provide a recessed wall fixture mounting means which is simple in design and construction, inexpensive to manufacture, easy to use, and easy to apply.

An object of the invention is to provide a recessed wall fixture mounting means which can be manufactured very inexpensively as the component parts are easily made and the assembly of parts readily accomplished.

An object of the invention is to provide a wall fixture which has resilient leg portions which closely overlie the body of the wall fixture in penetrating a wall opening so that the opening required to insert the mounting means and fixture is only slightly larger than the body portion of the fixture itself.

An object of the invention is to provide a mounting means which is pivotally mounted on legs which are self-expandable behind the fixture and which spread to a point spaced well from the edges defining the wall opening so as to contact a strong non-apertured portion of the wall.

These and other objects of the invention will become apparent by reference to the following description of a recessed wall fixture mounting means embodying the invention taken in connection with the accompanying drawing in which:

Fig. 1 is a side elevational view of the fixture equipped with the inventive mounting means shown adjacent a wall having a receiving opening.

Fig. 2 is a view similar to Fig. 1 showing the fixture and mounting means partially inserted through the wall opening showing the fully converged position of the legs adjacent the fixture body in dotted lines.

Fig. 3 is a view similar to Figs. 1 and 2 showing the wall fixture securely mounted in the wall opening via the inventive mounting means.

Fig. 4 is a cross-sectional view of Fig. 3 taken on the line 4—4 thereof showing the wide leg portions contacting the wall preventing tipping; and Fig. 5 is a cross-sectional view of Fig. 4 taken on the line 5—5 thereof showing the cramping relation between the leg aperture side walls and the side of the dog on the cross bar.

Referring now to the drawing wherein like numerals refer to like and corresponding parts throughout the several views, the recessed wall fixture and mounting means disclosed therein comprises a wall fixture 10 having a cross strap 20 secured thereto with bolts 18 and 19 with like legs 28 pivotally mounted on the cross strap 20 and resiliently biased by the spring 41.

More particularly, the wall fixture 10 comprises a flange 11 adapted to abut a wall 12, outer face 13 in surrounding relationship to the wall aperture 14, and a body 15 secured to the flange 11 adapted to fit in the wall aperture 14 and equipped with apertures 16 and 17 for receiving the bolts 18 and 19 respectively while the attaching means comprises a flat cross strap 20 equipped with threaded apertures 22 and 23 for receiving the bolts 18 and 19 respectively so that by turning the bolts in one direction the cross strap 20 is drawn toward the flange 11 and body 15 and by turning the bolts in the opposite direction the cross strap 20 is moved away from the flange 11 and body 15.

The cross strap 20 is equipped with like opposite ends 21 constituting leg abutting fulcrum surfaces 22 and rectangular dogs 23 extending from the cross strap like opposite ends 21 and interrupting the fulcrum surfaces 22 in their central area; the dogs 23 are equipped with opposite sides 24 and 25 and opposite ends 26 and 27 for coaction with the side walls of the leg apertures as hereinafter more fully described.

The like oppositely disposed legs 28 are provided with a dog receiving aperture 29 adjacent one end of each leg 28 dividing the legs 28 into long portions 30 and short portions 31 so that the legs 28 disposed against the cross strap fulcrum surfaces 22 with the dogs 23 in the leg apertures 29 constitute pivotally mounted levers.

The pivotal movement of the legs 28 is restricted in that the leg opposite internal side walls 32 and 33 and the leg opposite end walls 34 and 35 defining the leg apertures 29 are respectively positioned adjacent the opposite sides 33 and 32 and ends 26 and 27 of the dogs 23 and the leg internal side walls 32 and 33 are spaced slightly farther apart than the dimension between the dog sides 24 and 25 to permit pivotal swinging movement of the legs 28 relative to the cross strap 20 from the normal position seen in dotted lines in Fig. 2 to the greater than included right angular position seen in the other figures wherein the leg internal side walls 32 and 33 respectively contact the dog sides 24 and 25 thereby cramping the dog 23 in the aperture 29 thereby preventing further pivotal movement so as to bind the cross strap 20 and the legs 28 into a locked truss.

The legs 28 are further provided with spring connecting apertures 40 of any suitable size for receiving the ends of the spring 41 and the spring thereby displaceably urges the short leg portions 31 inwardly on one side of the cross strap fulcrum surfaces 22 and urges the leg long portions 30 outwardly on the other side of the surfaces 22 as seen in Fig. 1 and permits the leg long portions 30 to be moved toward one another for the purpose of inserting the device past the edges of a wall defining the wall receiving aperture.

The device is set up and the wall opening is prepared as seen in Fig. 1 and the device moved relative to the wall from the position seen in Fig. 1, through the position seen in Fig. 2, to the position seen in Fig. 3 and it is to be noted that the flat legs 28, Fig. 2, are adapted to collapse and overlie the body 15 so that the wall opening need only be slightly larger than the body 15 and it is also to be noted that the legs' outer ends contact the back 43 of the wall 12 remote from the aperture 14 and that they are provided with sharp edges 44 which bite into the wall back 43 so as to prevent outward sliding of the leg ends 42 and overcramping of the dogs 23 and also prevent sliding of the mounting behind the wall 12. The dog ends 42 are also enlarged to prevent sidewise tipping of the securing apparatus under the force exerted by the bolts.

In use, the operator merely inserts the inventive device in the wall opening 14 whereupon the legs 28 collapse against the body 15 to by-pass the wall edges and after the leg ends have passed the wall edges the spring pivots the legs to the locked truss position and the user then turns the bolts 18 and 19 to draw the cross bar 20 toward the body 15 whereupon the leg sharp edges 44 bite into the wall back 43 and press in one direction thereagainst while the flange is urged in the opposite direction against the wall face thereby securely locking the device in a recessed condition in the wall.

While only a single embodiment of the invention has been shown and described in detail, it is obvious that many changes may be made in the size, shape, detail, and arrangements of the various elements of the invention within the scope of the appended claims.

I claim:

1. A recessed wall fixture mounting combination comprising a flat cross strap having opposite ends constituting leg abutting fulcrum surfaces, rectangular dogs extending from said cross strap opposite ends and interrupting said leg abutting surfaces; said dogs having opposite sides and ends; flat legs cross-wise pivotally disposed relative to said cross strap at the opposite ends of said cross strap abutting said strap end fulcrum surfaces at a point adjacent one end of said legs defining a wall contacting leg long portion and a projecting leg short portion on either side of said strap; said legs having rectangular dog receiving apertures defined by internal side and end walls lying parallel to said dog sides and ends; said leg internal side walls being slightly spaced from said dog sides when said legs are lying normal to said cross strap; said leg internal side walls being adapted to crampingly engage said dog sides when said leg long portions are pivoted outwardly from a closed position normal to said cross strap to a spread position relative to said cross strap greater than an included right angle to prevent further relative angular movement so as to form a locked truss composed of said cross strap, dogs, and legs; a spring disposed between said leg short portions resiliently urging said legs into a spread locked truss condition relative to said cross strap, a receptacle body adapted to be recessed in a wall opening disposed between said leg long portions, at least one bolt freely disposed in said receptacle body threaded in said cross strap, a flange on said body adapted to abut a wall face adjacent a wall opening; said leg long portions in passing through a wall opening being adapted to contact the edges defining a wall opening and to pivotally converge against said spring toward one another and to closely overlie said receptacle body to by-pass the wall edges defining a wall opening and after passing the wall opening edges to pivotally diverge with said spring to spread truss condition behind a wall; said bolt being adapted to urge said body and cross strap toward one another to urge said flange into engagement with a wall face and said leg long portions into engagement with a wall back so as to securely mount said body in a recessed condition in a wall opening; said leg long portions having wide ends for engaging a wall back to provide a wide base to prevent tipping of said legs and cross strap behind said wall under the force exerted by said bolt.

2. A recessed wall fixture mounting combination comprising a flat cross strap having opposite ends constituting leg abutting fulcrum surfaces, rectangular dogs extending from said cross strap opposite ends and interrupting said leg abutting surfaces; said dogs having opposite sides and ends, flat legs cross-wise pivotally disposed relative to said cross strap at the opposite ends of said cross strap abutting said strap end fulcrum surfaces at a point adjacent one end of said legs defining a wall contacting leg long lever portion and a projecting leg short lever portion on either side of said strap; said legs having rectangular dog receiving apertures defined by internal side and end walls lying parallel to said dog sides and ends; said leg aperture side walls being slightly spaced from said dog sides when said legs are lying normal to said cross strap; said leg aperture side walls being adapted to crampingly engage said dog sides when said leg long lever portions are pivoted outwardly from a closed position normal to said cross strap to a spread position relative to said cross strap greater than an included right angle to prevent further relative angular movement so as to form a locked truss composed of said cross strap, dogs, and legs; a spring disposed between said leg short lever portions resiliently urging said legs into a spread locked truss condition relative to said cross strap, a receptacle body adapted to be recessed in a wall opening disposed between said leg long portions, bolts freely disposed in said receptacle body threaded in said cross strap, a flange on said body adapted to abut a wall face adjacent a wall opening; said leg long portions in passing through a wall opening being adapted to contact the edges defining a wall opening and to pivotally converge against said spring toward one another and to closely overlie said receptacle body to by-pass the wall edges defining a wall opening and after passing the wall opening edges to pivotally diverge with said spring to the spread truss condition behind a wall; said bolts being adapted to urge said body and cross strap toward one another to urge said flange into engagement with a wall face and said leg long portions into engagement with a wall back so as to securely mount said body in a recessed condition in a wall opening; said leg long portions having a sharp edge adapted to contact the back of a wall to bite into the back of a wall so as to prevent outward sliding of said leg long portions.

3. A recessed wall fixture mounting combination comprising a flat cross strap having opposite ends constituting leg abutting fulcrum surfaces, rectangular dogs extending from said cross strap opposite ends and interrupting said leg abutting surfaces; said dogs having opposite sides and ends, flat legs cross-wise pivotally disposed relative to said cross strap at the opposite ends of said cross strap abutting said strap end fulcrum surfaces at a point adjacent one end of said legs defining a long wall contacting leg long portion and a projecting leg short portion on either side of said strap; said legs having rectangular dog receiving apertures defined by internal side and end walls lying parallel to said dog sides and ends; said leg internal side walls being slightly spaced from said dog sides when said legs are lying normal to said cross strap; said leg internal side walls being adapted to crampingly engage said dog sides when said leg long portions are pivoted outwardly from a closed position normal to said cross strap to a spread position relative to said cross strap greater than an included right angle to prevent further relative angular movement so as to form a locked truss composed of said cross strap, dogs, and legs; a spring disposed between said leg short portions resiliently urging said legs into a spread locked truss condition relative to said cross strap, a receptacle body adapted to be recessed in a wall opening disposed between said leg long portions, bolts freely disposed in said receptacle body threaded in said cross strap, a flange on said body adapted to abut a wall face adjacent a wall opening; said leg long portions in passing through a wall opening being adapted to contact the edges defining a wall opening and to pivotally converge against said spring toward one another and to closely overlie said receptacle body to by-pass the wall edges defining a wall opening and after passing the wall opening edges to pivotally diverge with said spring to the spread truss condition behind a wall; said bolts being adapted to urge said body and cross strap toward one another to urge said flange into engagement with a wall face and said leg long portions into engagement with a wall back so as to securely mount said body in a recessed condition in a wall opening; said leg long portions having wide ends with a sharp edge for engaging a wall back to provide both a wide base to prevent sidewise tipping of said legs and cross strap and also to provide a biting edge to prevent outward sliding of said leg long portions.

4. A recessed wall fixture mounting combination comprising a cross strap having opposite ends constituting leg abutting fulcrum surfaces, dogs extending from said cross strap opposite ends and interrupting said leg abutting surfaces; legs pivotally disposed relative to said cross strap at the opposite ends of said cross strap abutting said strap end fulcrum surfaces at a point adjacent one end of said legs defining a wall contacting leg long portion and a projecting leg short portion on either side of said strap; said legs having internal walls defining apertures for receiving said dogs, said leg aperture walls being slightly spaced from said dog when said legs are lying normal to said cross strap; said leg internal side walls being adapted to crampingly engage said dog when said leg long portions are pivoted outwardly from a closed position normal to said cross strap to a spread position relative to said cross strap greater than an included right angle to prevent further relative angular movement so as to form a locked truss composed of said cross strap, dogs, and legs; a spring disposed between said leg short portions resiliently urging said legs into a spread locked truss condition relative to said cross strap, a receptacle body adapted to be recessed in a wall opening disposed between said leg long portions, bolts freely disposed in said receptacle body threaded in said cross strap, a flange on said body adapted to abut a wall face adjacent a wall opening; said leg long portions in passing through a wall opening being adapted to contact the edges defining a wall opening and to pivotally converge against said spring toward one another and to closely overlie said receptacle body to by-pass the wall edges defining a wall opening and after passing the wall opening edges to pivotally diverge with said spring to the spread truss condition behind a wall; said bolts being adapted to urge said body and cross strap toward one another to urge said flange into engagement with a wall face and said leg long portions into engagement with a wall back so as to securely mount said body in a recessed condition in a wall opening.

References Cited in the file of this patent

UNITED STATES PATENTS

| | | |
|---|---|---|
| 1,779,681 | Smith | Oct. 28, 1930 |
| 2,604,285 | Knoch | July 22, 1952 |